United States Patent [19]
Fatehi et al.

[11] Patent Number: 5,673,142
[45] Date of Patent: Sep. 30, 1997

[54] OPTICAL AMPLIFIER WITH INTERNAL INPUT SIGNAL MONITORING TAP

[75] Inventors: Mohammad T. Fatehi, Middletown; Hossein Izadpanah, Tinton Falls, both of N.J.

[73] Assignee: Lucent Technologies Inc., Murray Hill, N.J.

[21] Appl. No.: 692,296

[22] Filed: Aug. 1, 1996

Related U.S. Application Data

[63] Continuation of Ser. No. 537,161, Sep. 15, 1995, abandoned.
[51] Int. Cl.$^6$ .................................... H01S 3/00; H04B 10/02
[52] U.S. Cl. ............................................ 359/341; 359/177
[58] Field of Search ............................. 359/391, 177

[56] References Cited

U.S. PATENT DOCUMENTS

| | | | |
|---|---|---|---|
| 5,355,248 | 10/1994 | Hadjifotiou | 359/341 |
| 5,455,704 | 10/1995 | Mizuochi et al. | 359/179 |
| 5,471,334 | 11/1995 | Masuda et al. | 359/177 |
| 5,500,756 | 3/1996 | Tsushima et al. | 359/174 |
| 5,528,404 | 6/1996 | MacKichan | 359/110 |
| 5,563,733 | 10/1996 | Mitsuda et al. | 359/341 |

*Primary Examiner*—Mark Hellner
*Attorney, Agent, or Firm*—Thomas Stafford

[57] ABSTRACT

An optical monitor tap in fiber optical amplifiers is achieved in a configuration with internal input signal monitoring taps, in accordance with the principles of the invention, by placing the tap some distance into the actual optical amplifier active fiber. This allows the system to minor the integrity of the amplifier without impairing the quality of the associated signal. In an illustrative embodiment of the present invention, the amplifier is generally comprised of a long piece of rare-earth material doped fiber to which a fiber optic pump source is coupled via a wavelength divisional multiplexer (WDM) coupler. The tap is placed at some distance from the input of the fiber amplifier. The distance should be small enough such that there has been amplification of the signal but not so much as to have the signal saturated or compressed.

18 Claims, 3 Drawing Sheets

OPTICAL AMPLIFIER WITH INTERNAL INPUT SIGNAL MONITORING TAP

RELATED APPLICATION

This application is a continuation of application Ser. No. 08/537,161 filed on Sep. 15, 1995 now abandoned.

FIELD OF THE INVENTION

This invention relates generally to optical amplifiers for lightwave communications and, more particularly, to performance monitoring and fault isolation in multi-wavelength optical networks and optical amplifiers without impairments associated with input optical taps.

BACKGROUND OF THE INVENTION

Optical amplifiers in the form of erbium-doped fiber amplifiers (EDFAs) are expected to replace the current opto-electronic regenerators in many future optical long haul terrestrial and undersea lightwave communications systems. Optical amplifier may be used as power amplifiers to boost transmitter power, as preamplifiers to increase receiver sensitivity; and, as repeaters to periodically boost the signal to a level sufficient for it to travel the entire lightwave system or at least to the next amplifier. Links between these amplifiers are designed for maximum distance with the given power and Signal-to-Noise-Ration (SNR) of the line. When the optical link is terminated at the optical amplifier, the signal level is generally very low and close to its permissible limit. For performance monitoring and for fault isolation and location purposes, the signal must be monitored at the Network Element (NE) boundaries of the amplifier. At the input of the optical amplifiers, incorporated in the NE, a fraction of the incoming signal must be tapped off and monitored for integrity (power level, SNR, wavelength, etc.). Similarly, a fraction of the outgoing signals are monitored to ensure that each wavelength channel meets the specification of the amplifier prior to leaving the NE. Each monitor tap must require a fiber coupler with its own insertion loss. With an incoming signal already so close to the minimum design level, this loss is very poorly tolerated and will have a great adverse effect on the system SNR if the monitor is placed at the input to the NE. Placing the monitor at the output produces other problems as the output of the amplifier is not the true representation of the original input signal. The amplified output has been saturated and therefore the signal gain is compressed. In order to isolate the amplifier components for fault recognition, it is desirable to monitor the signal closest to the boundaries of the system. Therefore a need has arisen to monitor the integrity of the signal prior to full amplification but before there is a significant or substantial loss of the input signal.

SUMMARY OF THE INVENTION

An optical monitor tap in fiber optical amplifiers is achieved in a configuration with internal input signal monitoring taps, in accordance with the principles of the invention, by placing the tap some distance into the actual optical amplifier active fiber. This allows the system to monitor the integrity of the amplifier without impairing the quality of the associated signal.

In an illustrative embodiment of the present invention, the amplifier is generally comprised of a long piece of rare-earth material doped fiber to which a fiber optic pump source is coupled via a wavelength divisional multiplexer (WDM) coupler. The tap is placed at some distance from the input of the fiber amplifier. The distance should be small enough such that there has been amplification of the signal but not so much as to have the signal saturated or compressed.

DETAILED DESCRIPTION OF THE EMBODIMENT

Figure 1:
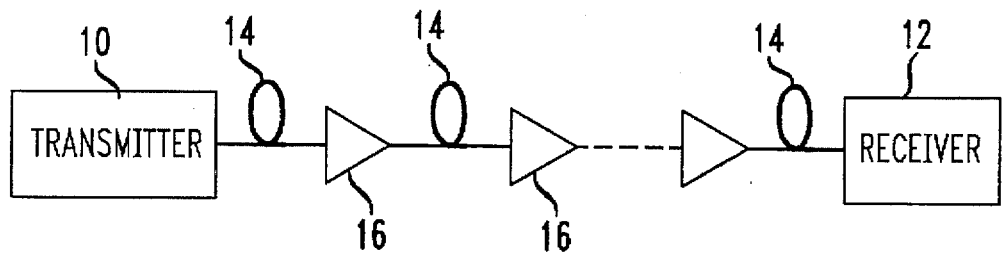
FIG. 1 shows a simplified block diagram of a lightwave communication network system utilizing a chain of optical amplifiers repeaters.

A lightwave transmission system is shown in FIG. 1 having a concatenated amplification chain. The system includes a chain of optical amplifiers 16 and interconnecting spans of optical fiber 14 for serving as lightwave transmission media to interconnect the amplifiers so that lightwave transmitter 10 is connected ultimately with lightwave receiver 12. Each span of optical fiber has a particular intrinsic loss at the wavelength of operation for the system. The fiber intrinsic loss is generally compensated by the gain of the optical amplifiers. Systems such as the one depicted in FIG. 1 are expected to cover distances from hundreds of meters in a building environment to many thousands of kilometers in transcontinental and transoceanic applications.

For the system in FIG. 1, optical amplifiers are realizable as semiconductor or doped fiber optical apparatus. It will be apparent to persons skilled in the art after reading the following description that the principles of the present invention are equally applicable to traveling wave optical amplifiers and rare-earth doped optical fiber amplifiers. For uniformity and ease of understanding in the following description, the particular exemplary embodiment described is that of an erbium doped optical fiber amplifier which is optically pumped. However, it is contemplated that other known rare-earth elements may be used in particular applications of the invention, for example, praseodymium.

Figure 2:
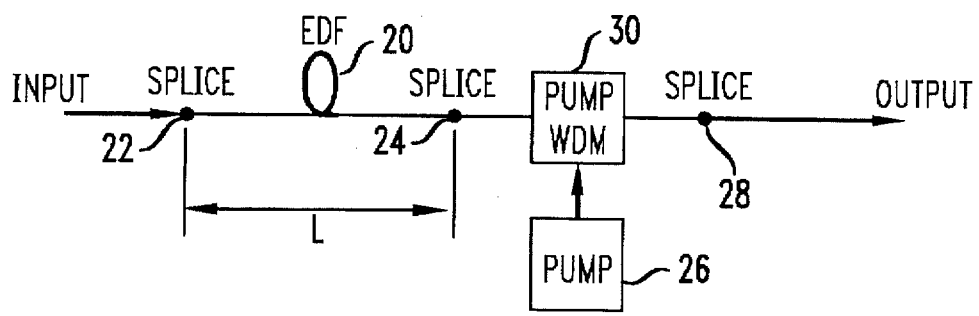
FIG. 2 shows a typical amplifier arrangement with a WDM coupler and pump source.

The optical apparatus shown in FIG. 2 is a more detailed layout of a typical counter propagating pumped amplifier. Length L, between the first splice 22 and second splice 24, is erbium doped fiber (EDF) 20. Into this active fiber section is "pumped" luminous energy, which as a shorter wavelength than the signal and excites the electrons of the dopants present in the fiber to an excited state so that stimulated emission may occur. The passage of a signal at a wavelength corresponding to that of the excited state is apt to cause the decay from the excited state to the ground state of the dopant electrons, with an associated stimulated emission, thereby amplifying the signal.

Known incident directions of the pumping light are forward pumping to launch the signal light and the pumping light into incidence so that they propagate in the same direction in the optical fiber; backward pumping, as shown in FIG. 2, to launch the two lights so that they propagate in reverse directions to each other; and hybrid pumping using both forward pumping and backward pumping. These techniques are further described in U.S. Pat. No. 5,218,608 to Aoki and hereinafter incorporated by reference.

The pumping is usually provided by a laser source or pump 26, inserted into the fiber that carries the signal by means of an optical multiplexer 30 between two passive splices 24 and 28. The minimum luminous power required at each section of the active fiber to produce amplification gain is referenced to as the threshold power; above this level there occurs a so-called reversal of population among the dopant atoms of the EDF. This means that the number of the atoms in the excited state becomes larger than the number of the atoms in the ground, unexcited state. However, the desired amplifying effect is typically accomplished by an undesired effect of noise introduction.

Figure 3:
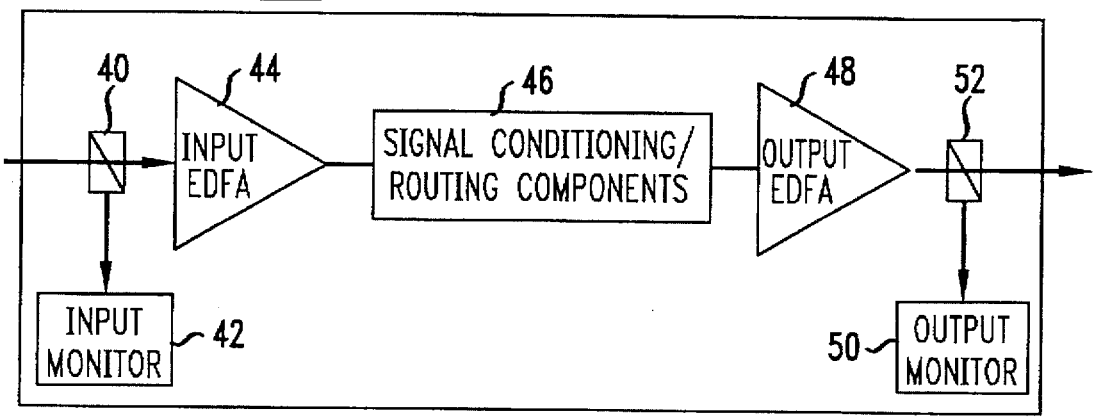
FIG. 3 shows a simplified schematic drawing of a Network Element or repeater architecture.

In order to ensure the integrity of the signal and therefore of the overall lightwave communication system, monitors have typically been placed at the input 40 and/or output 32 of the amplifier network element as shown in FIG. 3. An input monitor 42 is passively coupled by an optical coupler or tap 40 before any amplification occurs. The signal is then amplified via an input optical EDF amplifier (EDFA) 44. Depending on whether the system is used as a simple repeater or as a multi-wave length network element, such as a multi-channel cross-connect, the signal is sent through a signal conditioning/routing component 46 and the further amplified via an output EDFA 48. As an alternative to the input monitor 42, an output monitor 50 is passively coupled by an optical coupler or tap 52 just prior to the output of the network element.

Figure 4:
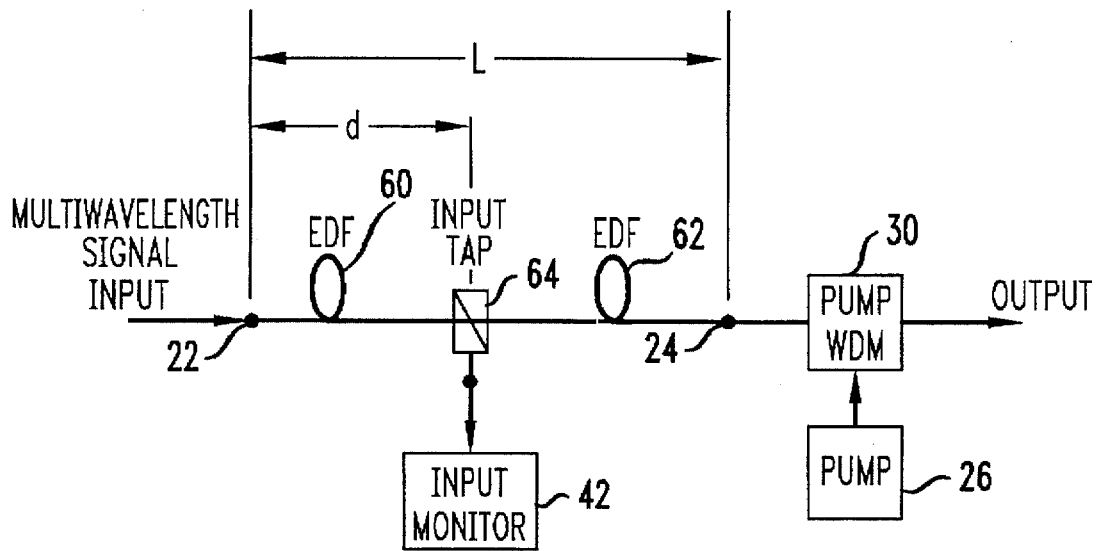
FIG. 4 shows a simplified block diagram of an illustrative arrangement of a fiber optic amplifier embodying the principles of the present invention.

In the preferred embodiment of the present invention, the active length L, is divided into two segments as illustrated in FIG. 4. The two segments are of length d and L-d, and begin and end at their respective splices 22 and 24. Both length d and length L-d are appropriately doped with a rare earth element, for example, erbium to form EDF 60 and EDF 62.

The pump 26 is preferably multiplexed just after the active region through a wavelength division multiplexer 30 to create a backward pumping but will function equally well with a forward pump or hybrid pump.

The tap 64 is now placed at a distance d, o<d<L, from the input side. The input monitor 42 is equivalent to one used in the prior art only in the prior art the tap was prior to any amplification, as described above. While the first segment acts as a remotely pumped small signal amplifier operating in the linear region for the monitored signal, both sections provide the required amplification and signal conditioning for the passing signal. The d:L ratio is a significant design criteria in this illustrative example. The amplification of the signal occurs as the signal travels from the input side to the output side along the doped fiber. The signal must be sufficiently amplified at the location of the tap in order to ensure valid monitoring, but before the onset of saturation and gain compression.

Moving the tap inside of the doped fiber greatly increases the effectiveness of the input monitor 42 by having the signal at least weakly amplified and therefore the concern of the power penalty of the monitor itself is no longer an issue. The monitoring of the increased signal also permits taping without adverse SNR degradation as would be by monitoring at the output of the fiber.

Figure 6:
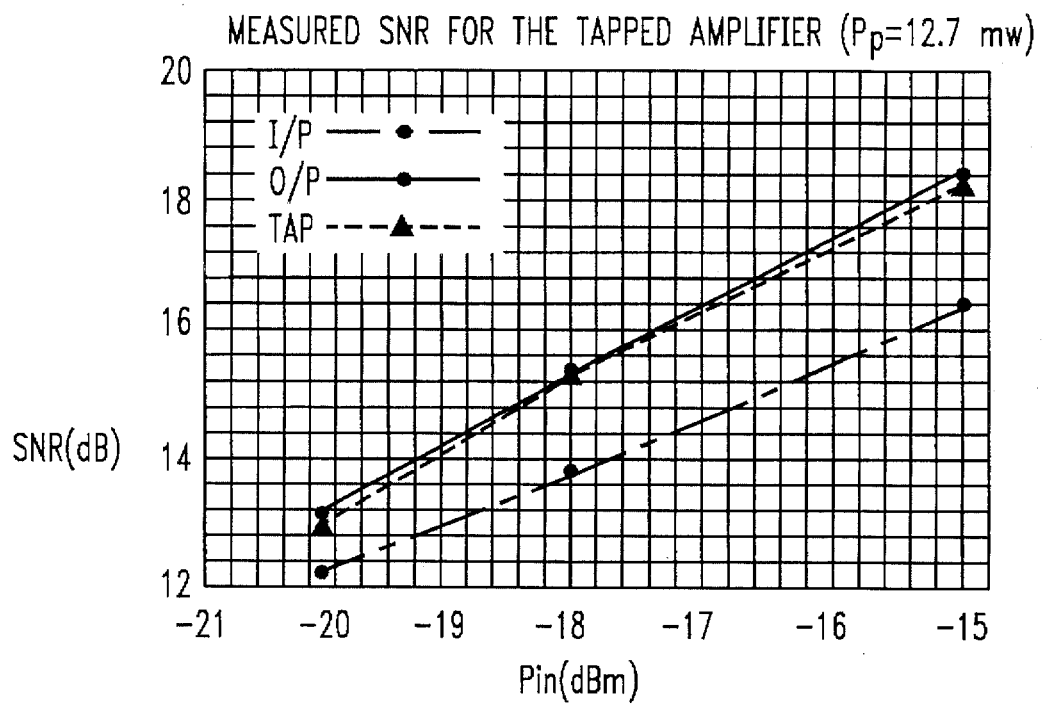
FIGS. 6 and 7 show the signal-to-noise ratio (SNR) experimentally measured at various points in the arrangement of FIG. 4 as a function of input power level.
Figure 7:
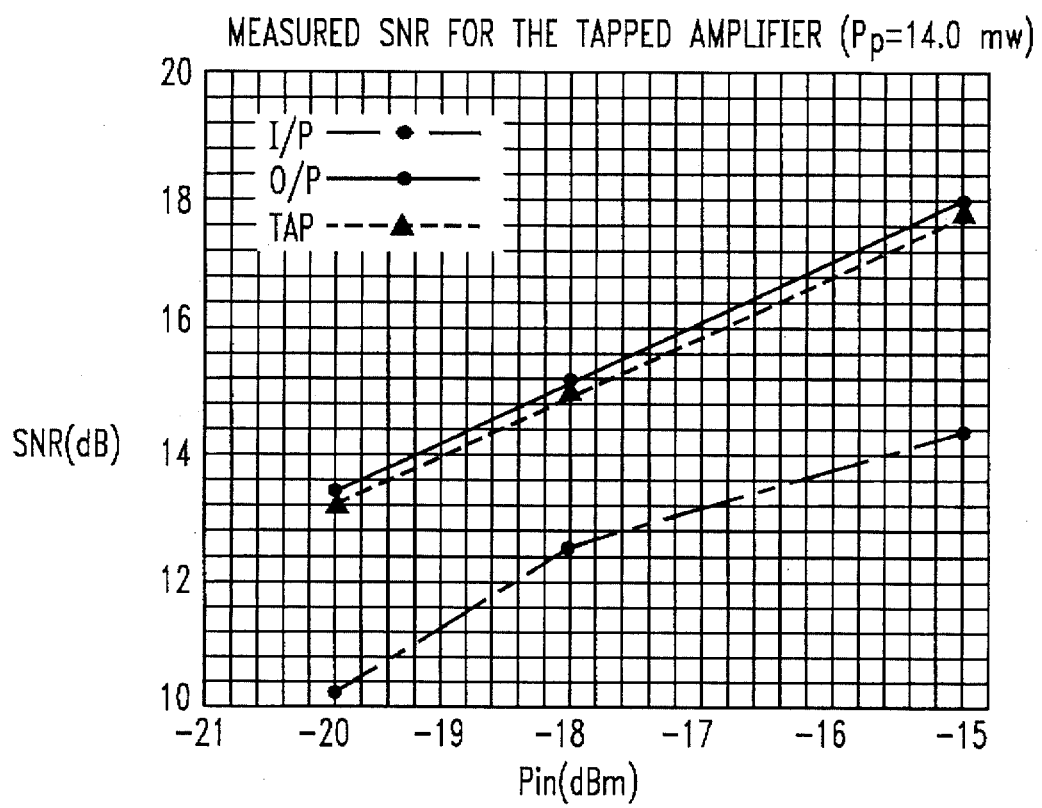

As an example, a 90/10 directional coupler tap is placed between the two pieces of the EDF fibers where d=5 meters and L−d=15 meters in length. The counter-pump is set a 1480 nm. The amplifier gain is measured as a function of input signal power for various currents to ensure that there is no significant degradation of the SNR. As FIGS. 6 and 7 show, the SNR is measured at the input, tap, and output for pump currents of 175 mA and 200 mA, respectively as a function of input power. The gain of the first EFDA section, measured at the tap point, is in the 0.88 dB and 1.23 dB range and virtually no degradation is shown.

Figure 5:
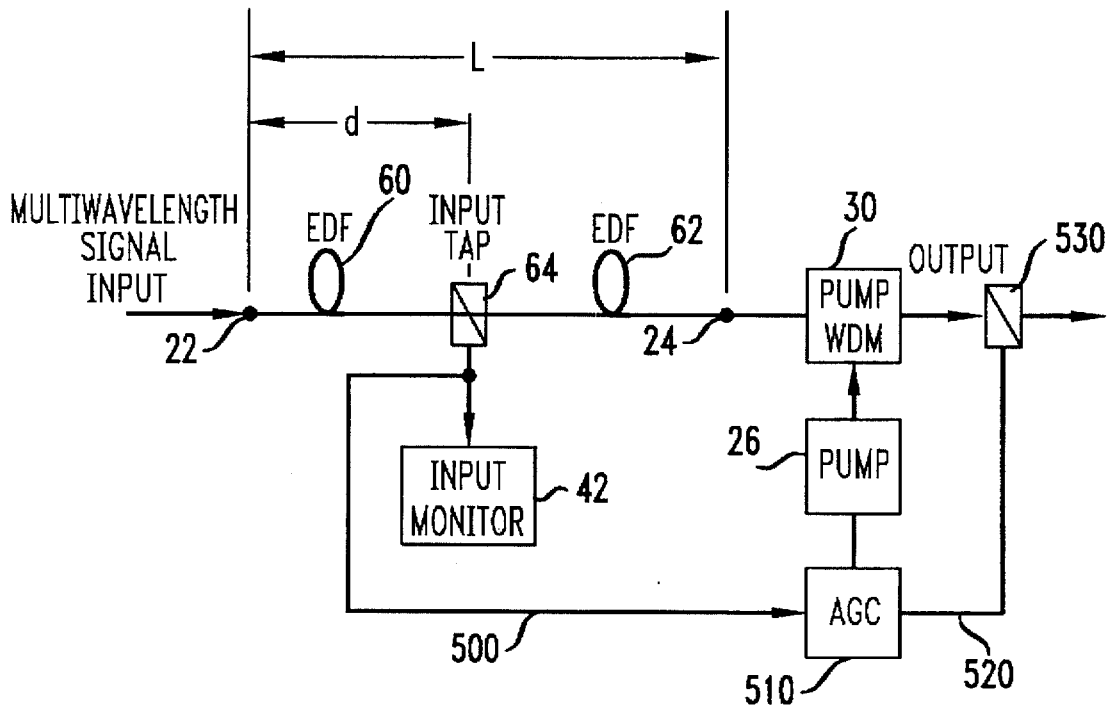
FIG. 5 shows a second arrangement of elements, in accordance with the principles of the present invention, including the illustrative embodiment of FIG. 4 in combination with an automatic gain control element.

Referring now to FIG. 5, there is shown a second arrangement of elements, in accordance with the principles of the invention, including the illustrative example of the invention shown in FIG. 4, in combination with an automatic gain controller. In this arrangement, optical tap 530 (which may, for example a 10 dB tap), it disposed at the output of EDF 62. Optical tap 530 diverts a portion of the output to automatic gain controller 510 via fiber 520. Automatic gain controllers are known. Automatic gain controller 510, in response to the optical signal level received on fiber 520, adjust the bias circuitry of pump 26 in order achieve a desired output level of the EDF device, using conventional techniques. In accordance with the principles of the invention, automatic gain controller 510 is further arranged to receive as a second input a line monitoring signal from input tap 64, as shown in FIG. 5, via fiber 500. Advantageously, this allows automatic gain controller to control the gain of the device as a function of input level. For example, such an arrangement provides for redundancy in case of failure in the output level monitoring system, and provides for greater control flexibility. In cases of input signal loss, the use of the additional automatic gain controller input on line 550 would allow automatic gain controller 510 to shut down pump 26 without deleteriously amplifying the amplified spontaneous emission in the EDFA that would occur as a result of the high gain level set by the automatic gain controller in the absence of an input signal.

It will be understood that the particular techniques described above are only illustrative of the principles of the present invention, and that various modifications could be made by those skilled in the art without departing from the scope and spirit of the present invention, which is limited only by the claims that follow.

The invention claimed is:

1. A single optical amplifier with an integrated coupler, comprising:

a first segment of rare-earth doped fiber;

a second segment of rare-earth doped fiber;

a source of pump light to pump said second segment; and an optical coupler having an input port, an output port, and a monitoring port, said coupler coupling said first segment to said input port, coupling said second segment to said output port such that a first portion of an optical signal propagating in said first segment is transmittable from said first segment to said second segment, and such that a second portion of said optical signal is divertable to said monitoring port, wherein the length of said first segment is selected such that the optical amplification gain of said first segment is substantially linear and wherein said first segment is pumped by excess pump power through said second segment.

2. The optical amplifier of claim 1 wherein said rare-earth doped optical fiber comprises an erbium-doped optical fiber.

3. The optical amplifier of claim 1 wherein optical coupler is a 10 dB optical coupler.

4. The optical amplifier of claim 1 further including a coupler disposed at the output of said second segment coupling a portion of an output of said optical amplifier to an automatic gain controller.

5. The optical amplifier of claim 1 wherein said pump is arranged in a co-propagating pump configuration.

6. The optical amplifier of claim 1 wherein said pump is arranged in a counter-propagating pump configuration.

7. The optical amplifier of claim 1 wherein said pump is arranged in a hybrid pump configuration.

8. A single optical amplifier, comprising:

a rare-earth-doped optical fiber for optically amplifying a signal propagating in said fiber and having an optical amplification gain profile including a substantially linear first portion and a non-linear second portion;

a source of pump light to pump said second portion; and an optical tap, including a monitor port, said optical tap being disposed along said optical fiber for diverting a portion of said optical signal for monitoring characteristics of said optical signal, wherein said optical tap is disposed along a length of said fiber that imparts amplification from said substantially linear first portion of said optical amplification profile, wherein said first portion is pumped by excess pump power through said second portion.

9. The optical amplifier of claim 8 wherein said rare-earth doped optical fiber comprises an erbium-doped optical fiber.

10. The optical amplifier of claim 8 wherein optical coupler is a 10 dB optical coupler.

11. The optical amplifier of claim 8 further including a coupler disposed at the output of said second portion coupling a portion of an output of said optical amplifier to an automatic gain controller.

12. The optical amplifier of claim 8 wherein said pump is arranged in a co-propagating pump configuration.

13. The optical amplifier of claim 8 wherein said pump is arranged in a counter-propagating pump configuration.

14. The optical amplifier of claim 8 wherein said pump is arranged in a hybrid pump configuration.

15. A single optical amplifier, comprising:

a rare-earth-doped optical fiber having an optical amplification gain profile including a substantially linear first portion and a non-linear second portion;

a source of pump light to pump said second portion; and an optical tap, including a monitor port, said optical tap being disposed along said optical fiber diverting a portion of an optical signal propagating in said fiber to a monitor port, wherein said optical tap is disposed along a length of said fiber that imparts amplification from said substantially linear portion of said optical amplification profile, wherein said first portion is pumped by excess pump power through said second portion.

16. The optical amplifier of claim 15 wherein said rare earth doped optical fiber comprises an erbium-doped optical fiber.

17. The optical amplifier of claim 15 wherein optical coupler is a 10 dB optical coupler.

18. The optical amplifier of claim 15 further including a coupler disposed at the output of said second portion coupling a portion of an output of said optical amplifier to an automatic gain controller.

* * * * *